United States Patent Office 3,451,220
Patented June 24, 1969

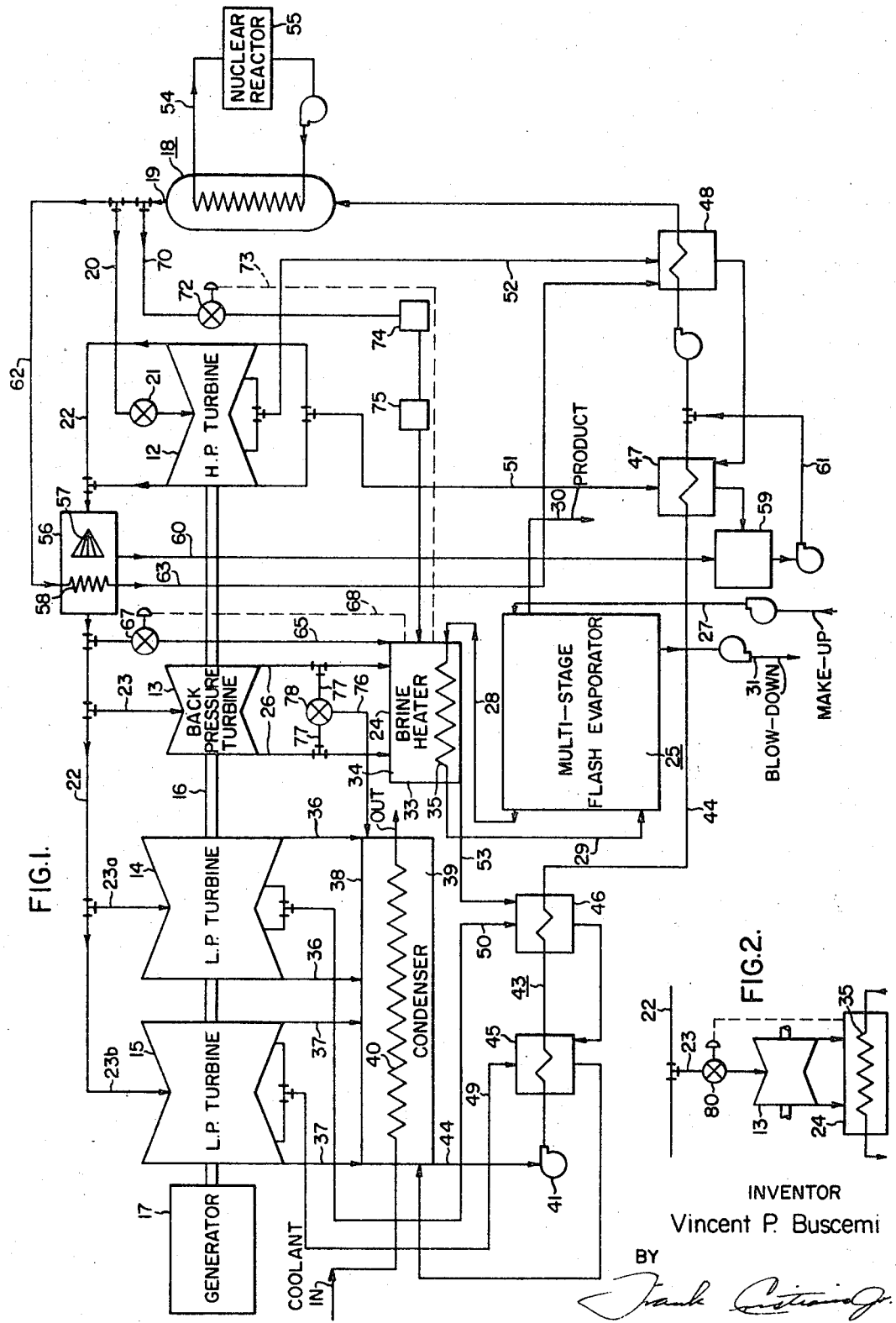

3,451,220
CLOSED-CYCLE TURBINE POWER PLANT AND DISTILLATION PLANT
Vincent P. Buscemi, Forest Hills, Pittsburgh, Pa., assignor to Westinghouse Electric Corporation, Pittsburgh, Pa., a corporation of Pennsylvania
Filed June 28, 1966, Ser. No. 561,279
Int. Cl. F02b *41/10;* F01k *7/16;* B01d *3/02*
U.S. Cl. 60—73                                   14 Claims

ABSTRACT OF THE DISCLOSURE

A combined closed-cycle condensable vapor motivated turbine power plant for generating electrical power and a liquid distillation plant for desalinating sea water, wherein the brine or feed liquid heater for the distillation plant is energized by exhaust steam from a back pressure turbine. The back pressure turbine is connected in tandem with one or more condensing turbines and the back pressure turbine and condensing turbines are fed motive vapor in parallel by a common conduit, thereby providing flexibility in control of the electrical and water production rates for varying demand.

The control includes an arrangement for controlling the pressure of the heating vapor admitted to the brine heater regardless of load demand on the turbines, during periods in which water distillation requirements are constant, and in which the hot exhaust vapor supply from the back pressure turbine to the brine heater may be diverted during no load requirements on the distillation plant.

The invention provides a combined plant of large output capability in which the hot vapor for motivating the turbines and the brine heater may be advantageously generated by a single nuclear reactor.

---

This invention relates to a combined closed-cycle turbine power plant and liquid distillation plant, but more particularly to a plural unit vapor turbine power plant for driving a common load, and for providing hot vapor to heat the liquid in a distillation plant.

It has been proposed to combine large vapor turbine generator power plants with large water distillation plants to effect economies inherent in such a combination.

One of the most readily recognized economic advantages of such a combination resides in the feasibility of providing high pressure and temperature steam for first driving the turbines and then, after substantial expansion to the lower pressure and temperature suitable for water distillation, utilizing the remaining heat energy of the steam for heating the water to be distilled.

Another economic advantage resides in the flexibility of such a combination since, when the generator load requirements are reduced, at least some of the excess vapor available from the steam generator can be, if desired, gainfully employed to increase the water distillation rate, and vice versa.

However, such combined plants heretofore proposed become quite complex and so costly that the capital cost of such plants becomes a dominant factor.

It is an object of this invention to provide an improved closed-cycle turbine power plant for driving a common load and for providing heat to a liquid distillation plant, which power plant is highly flexible in operation with regard to the common load output and/or water distillation rate, yet which has a reduced capital cost.

A further object is to provide a closed-cycle tandem compound turbine power plant having a back pressure turbine for generating shaft power in conjunction with the other turbines on the shaft and for providing heat to a brine heater for a water desalination plant, wherein the motive fluid supply to the back pressure turbine may be regulated independently of at least another turbine on the same shaft.

Another object is to provide a power plant of the above type in which the turbines are motivated by pressurized condensable vapor and jointly drive a common load, such as an electric generator, and in which one of the turbines is a back pressure, i.e. a non-condensing turbine in parallel flow relation with at least another turbine on the same shaft and arranged to exhaust its motive fluid after partial expansion to a heater for heating the liquid to be distilled in the distillation plant, and at least another turbine unit is a condensing unit.

A further object is to provide a tandem-compound vapor turbine power plant of the above type, wherein the pressure of the vapor admitted to the liquid heater is maintained at a substantially constant value regardless of turbine load demand, during periods in which the required water distillation rate is constant.

Still another object is to provide a power plant of the above type in which the hot vapor may be directed to the heater for the distillation plant after at least partial expansion in a turbine during all generating load conditions on the turbines, and in which the hot vapor supply from the back pressure turbine to the brine heater may be readily diverted during no load requirements on the distillation plant.

Yet another object is to provide a combined power plant of large output and of the above type in which the hot vapor for motivating the turbines and the liquid heater is generated by a single nuclear reactor.

Briefly, in accordance with the invention, there is provided a combined electrical generating and water desalinating plant of the flash evaporator type wherein a plurality of vapor turbines are connected in tandem with each other to jointly drive an electrical generator and one of the turbines is of the non-condensing type, i.e. a back pressure turbine, and arranged to provide partially expanded vapor to the "brine" heater of a flash evaporator for desalinating sea water or purifying impure water to provide potable water. At least one of the other turbines is of the condensing type and exhausts vitiated vapor to a condenser for condensation and subsequent return via a feed water heating system to a vapor generator to complete a closed loop or cycle.

The turbines are compounded in such a manner that hot pressurized motive vapor from the steam generator is jointly supplied to the back pressure turbine and to the other turbine at the same pressure and temperature, so that regulation or even interruption of the motive vapor supply to the back pressure turbine may be attained without interrupting the motive vapor supply to the other turbine, thereby permitting electrical power generation even with the back pressure turbine "shut down."

The "brine" heater is of the tube and shell type wherein the sea water or brine is directed through the tubes for heating and the vapor from the back pressure turbine is directed to the chamber defined by the shell and tubes. The condensate from the resulting heat exchange is directed to the steam generator jointly with the condensate from the condenser, and the thus heated brine or sea water is directed through the flash evaporator for distillation thereby to produce potable water.

The evaporator may be of any suitable type and of sufficient size to produce large quantities of potable water, for example it may be of the type more fully shown and described in R. L. Coit and E. F. Stalcup patent application Ser. No. 448,791, filed Apr. 16, 1965, now Patent 3,367,845, and assigned to the same assignee as the present invention.

Complete flexibility of operation of the combined electrical power generating and water desalination plant is attained for varying requirements of electrical load and water distillation, in a manner to be fully described in the following detailed description of the invention.

The above and the objects are effected by the invention as will be apparent from the following description and claims taken in connection with the accompanying drawings, forming a part of this application, in which:

FIGURE 1 is a diagrammatic view of a combined closed-cycle turbine power plant and distillation plant in accordance with the invention; and FIG. 2 is a fragmentary diagrammatic view illustrating a modification of the turbine power plant shown in FIG. 1.

Referring to the drawing in detail, in FIG. 1 there is shown a plurality of turbines including a high pressure (H.P.) turbine 12, a back pressure (B.P.) turbine 13, and a pair of low pressure (L.P.) turbines 14 and 15 connected in tandem with each other by a common shaft 16 and jointly driving a common load such as an electrical generator 17. All of the turbines (12–15), as illustrated, are of the double opposed-flow type, but other suitable types may be employed.

Hot pressurized motive fluid, such as steam, is supplied to the H.P. turbine 12 by a steam generator 18 by way of conduits 19 and 20 for initial partial expansion, and the rate of flow therethrough is controlled by a valve mechanism 21 in response to the load requirements of the generator 17. After leaving the H.P. turbine 12, the steam is directed by a crossover conduit structure 22 and parallel branch conduits 23, 23a and 23b to the B.P. turbine 13 and the two L.P. turbines 14 and 15, respectively. Accordingly, the turbines are compounded in such a manner that the turbines 13, 14 and 15 receive partially expanded steam from the H.P. turbine 12 at a common pressure and temperature.

The B.P. turbine 13 has its outlets connected to a "brine" heater 24 of a multi-stage flash evaporator 25 by a pair of conduits 26. The evaporator has not been shown in detail and need not be described, since it may be of any suitable type, for example, it may be of the type fully shown and described in R. L. Coit and E. F. Stalcup patent application Ser. No. 448,791 (mentioned previously).

However, it must be pointed out that the evaporator 25 is provided with incoming sea water or "make-up" water by a suitable conduit 27 which is subsequently directed to the "brine" heater 24 by a conduit 28 for heating to a "top" temperature and thence redirected by a conduit 29 to the evaporator for at least partial evaporation and condensation of the vapors to form potable water as the product. The potable water is thence withdrawn from the evaporator by the conduit 30 for consumption, while the unevaporated and enriched brine is subsequently withdrawn from the evaporator by a blow-down conduit 31 and returned to its original source.

The brine heater 24 is provided with a shell 33 defining a chamber 34 through which a heat exchange tube structure 35 extends and, in operation, the heating steam from the B.P. turbine 13 flows into the chamber 34 and around the tube structure 35 to heat the brine directed therethrough by the incoming conduit 28 from the evaporator and the outgoing conduit 29 to the evaporator.

The two L.P. turbines 14 and 15 have their exhaust outlets 36 and 37 connected to a condenser 38 having a condensing chamber 39 maintained at sub-atmospheric pressure, as well known in the art, and a heat exchange tube structure 40 extending therethrough for condensing the vitiated steam from the L.P. turbines. A suitable coolant such as river or sea water is directed through the condenser tube structure 40, as indicated and returned to its source, thereby to remove heat from the turbine plant. The resulting condensate is directed from the chamber 39 by a pump 41 and thence back to the steam generator 18 by way of a feedwater heating system, generally designated 43, to complete the closed cycle or loop.

The feedwater heating system comprises a conduit structure 44 extending from the condenser through the condensate pump 41 to the steam generator 18 and having a plurality of suitable feedwater heaters 45, 46, 47 and 48 serially interposed therein for progressively preheating the condensate on its return to the steam generator.

In a substantially conventional manner, the feedwater heater 45 is heated by partially expanded steam extracted from the L.P. turbine 15 and directed thereto by a conduit 49; the feedwater heater 46 is heated by partially expanded steam extracted from the L.P. turbine 14 and directed thereto by a conduit 50; and the feedwater heaters 47 and 48 are heated by steam extracted from the H.P. turbine 12 and directed thereto by conduits 51 and 52, respectively. For thermodynamic reasons, the steam for the feedwater heater 47 is extracted from the H.P. turbine 12 at a lower pressure and temperature than the steam for the feedwater heater 48.

The condensate formed in the brine heater 24 during heat exchange is withdrawn from the brine heater chamber 34 and returned to the feedwater heating system by a suitable conduit 53 connected to the feedwater heater 46.

In the system shown and thus far described, the steam generator 18 is preferably energized by a closed loop heat exchange circuit 54 employing a nuclear reactor 55 as a heat source. Since, as well known in the art, steam is generated by a nuclear reactor at moderate pressure ranges of from about 450 to 1000 p.s.i.g. at substantially dry and saturated conditions (i.e. with no or very slight superheat), after expansion in the H.P. turbine 12, it is desirable to remove moisture from the steam and reheat the thus demoisturized steam to prevent or at least reduce its erosive effect on the blading (not shown) of the turbines 13, 14 and 15. Accordingly, a pressure vessel 56 is interposed in the cross-over conduit 22 downstream of the outlet of the H.P. turbine 12 and upstream of the branch conduit 23 of the B.P. turbine. Within the vessel 56 there is provided a suitable moisture separator 57 and a heating tube structure 58. The moisture thus removed from the steam flow is directed to a suitable drain tank 59 by a conduit 60 and subsequently returned to the feedwater heating system by a conduit 61 communicating with the feedwater conduit 44.

The heating tube structure 58 is provided with steam directly from the steam generator 18 by way of a conduit 62 and, after employment in reheating the steam in the vessel 56, the condensed steam is subsequently directed by a conduit 63 to the feedwater heater 48 for augmenting the heating effect of the heater 48.

As thus far described, when the generator 17 is supplying rated electrical load, the steam regulating valve 21 is positioned to provide adequate steam to the turbines 12, 13, 14 and 15 to sustain such electrical load. Hence, the B.P. turbine 13 is provided with adequate steam by the branch conduit 23 to (1) share in sustaining the electrical load, and (2) to provide adequate heating steam to the brine heater 24 for heating the brine flowing therethrough at a rate commensurate with the rated potable water production demand of the flash evaporator 25.

However, during reduced electrical load requirements, the steam regulating valve 21 is effective to reduce the steam flow rate to the turbines, as required to maintain the electrical load, and concomitantly therewith the steam supply to the B.P. turbine 13 and hence to the brine heater 24 is proportionately reduced.

To maintain the required heating steam rate to the brine heater 24, there is provided a conduit 65 disposed in bypassing relation with the B.P. turbine 13 and communicating at its upstream end with the cross-over conduit 22 and at its downstream end with the brine heater chamber 34, thereby to augment the steam supply to the brine heater. Steam flow through the bypass conduit 65 is regulated by a valve 67 responsive to pressure in the brine heater chamber 34, as indicated by the dotted line 68, and arranged to maintain the steam pressure therein at a selected value.

Since the bypass conduit 65 receives steam after partial expansion in the H.P. turbine 12, the pressure and temperature of the additional heating steam thus delivered to the brine heater 24 (even though somewhat higher than that of the heating steam supplied to the brine heater by the B.P. turbine 13) is in a range that may be adequately sustained by the shell 33 of the brine heater, without resorting to unusual and expensive construction of the shell 33 or, conversely, without requiring desuperheating and/or depressurizing the steam before admission to the chamber 34.

During no load condition on the turbines (no electrical generation requirements) or in the event of "shutdown" of the turbines for any other reasons such as servicing, etc., the main steam regulating valve 21 is in the closed position, hence no heating steam for the brine heater is available from the B.P. turbine 13 or the bypass conduit 65.

To insure an adequate supply of heating steam to the brine heater during the above conditions, there may be provided a conduit 70 in direct communication with the steam generator 18 and the chamber 34 of the brine heater, and having a regulating valve 72 interposed therein that is responsive to the steam pressure in the chamber 34 as indicated by the dotted line 73. However, since the steam thus supplied is at maximum temperature and pressure, and therefore at a considerably higher pressure and temperature than the shell 33 of the brine heater can safely withstand, a steam desuperheating device 74 and a steam depressurizing device 75 are interposed in the conduit 70 to render the temperature and pressure of the resulting steam flow acceptable for the brine heater.

There may also be occasions when there are no requirements for water production by the flash evaporator 25, yet there is a requirement for the generation of electrical power. During such conditions the steam from the B.P. turbine 13 is diverted to the condenser 38 by a conduit 76 having branch connections 77 communicating with the turbine exhaust conduits 26 and having a valve 78 interposed therein. The valve 78 is disposed in the closed position during operation of the brine heater 24 but is movable to the open position to permit diversion of the heating steam therefrom during the above conditions. Since the condenser 38 is maintained at below atmospheric conditions during operation, as well known in the art, while the exhaust steam from the B.P. turbine is at above atmospheric pressure, a greatly preferential steam flow to the condenser is thus established when the valve 78 is in the open position, and the brine heater pressure will fall to a low value commensurate with the above conditions. Accordingly, to prevent assumption of control by valves 67 and/or 72, these valves may be maintained in their closed positions in any suitable manner. During such operation, a continuous flow of steam is thus maintained through the B.P. turbine 13 and bled to the condenser 38 at a controlled rate, thereby preventing or at least minimizing overheating of the turbine 13.

In FIG. 2 there is shown a modification of the apparatus shown in FIG. 1, wherein the flow of motive steam to the B.P. turbine 13 through the branch conduit 23 is controlled by a pressure regulating valve 80 responsive to pressure in the brine heater 24. With this arrangement, the B.P. turbine is directly controlled by water production requirements of the evaporator 25 (FIG. 1) and varies its electrical generating load sharing function. More particularly, regardless of the mass flow of motive steam through the cross-over conduit 22, the B.P. turbine is effective to accept only the rate of flow therefrom that is required to maintain the brine heater 24 at its operating level.

During conditions wherein there are no water production requirements, the regulating valve 80 is moved to the closed position, thereby interrupting the flow of steam therethrough. The B.P. turbine, during these conditions, will merely "windmill" and carry no load.

With the arrangement shown in FIG. 2, the bypass steam conduit 65 may be omitted if desired, since steam flow to the brine heater is under direct control of the B.P. turbine 13.

The arrangement shown in FIGS. 1 and 2 is capable of employment to produce large quantities of electrical power and pure water from sea, or otherwise impure water; for example, electrical power on the order of 1000 megawatts and water at the rate of 100 million gallons per day. Hence, it is peculiarly suited to employment with the steam generator 18 energized by the nuclear reactor 55, since nuclear reactors are primarily limited by capital cost to large parameters of operation.

More particularly, the invention provides a combined plant capable of closely matching the heat output of such a nuclear fired steam generator, so that power plants of double size, etc. may each be provided with identical nuclear fired steam generators, instead of sharing the steam generated by a common nuclear fired steam generator. Accordingly, the complex control problem associated with a dual shaft power plant fed by an odd number or a single nuclear fired steam generator is eliminated.

For example, in a presently proposed combined electrical power and water purification plant of large output, a three shaft steam turbine arrangement is necessarily employed to satisfy the combined power demand, but two nuclear fired steam generators are required, with attendant complexity of control.

It will now be seen that the invention provides a highly improved combined electrical power and water purification plant of great flexibility and high efficiency that lends itself to economies in manufacture resulting in lower capital cost and lower operational cost.

Although several embodiments of the invention have been shown, it will be obvious to those skilled in the art that it is not so limited, but is susceptible of various other changes and modifications without departing from the spirit thereof.

What is claimed is:
1. In combination:
  a closed-cycle thermal power plant operating with a condensable vapor motive fluid, comprising
  a first turbine, a second turbine and a third turbine arranged in tandem driving relation with each other and jointly driving a common load,
  means for generating said motive fluid,
  means for directing said motive fluid from said generating means at a first and highest temperature and pressure to said first turbine for partial expansion therein to a second and lower temperature and pressure,
  first conduit means for admitting said partially expanded motive fluid jointly to said second and third turbines for further expansion therein,
  said second turbine being a back pressure turbine and said third turbine being a condensing turbine, whereby the motive fluid is expanded in the back pressure turbine to a higher temperature and pressure than the motive fluid expanded in the condensing turbine,
  condenser means for condensing the motive fluid expanded in the condensing turbine,
  means including a second conduit structure for returning the condensate from said condenser to said vapor generator as feed liquid,
  a distillation plant, comprising at least one evaporation chamber for evaporating a liquid to be distilled, and heating means for heating the liquid to be distilled in said evaporation chamber, said heating means including a tube structure through which the liquid to be distilled is passed and a shell structure enclosing said tube structure and defining a heating chamber through which a heating fluid is passed, and means for admitting the partially expanded motive fluid from the back pressure turbine to said heating chamber to effect heating of the liquid to be distilled.

2. The structure recited in claim 1 and further including:

means connecting the heating chamber to the second conduit structure, whereby condensate formed in the heating chamber during the heat exchange between the motive fluid and the liquid to be distilled is returned as liquid feed to the vapor generator.

3. The structure recited in claim 1 and further including:

means for directing at least a part of the motive fluid after expansion in the first turbine to the heating chamber in bypassing relation with the back pressure turbine.

4. The structure recited in claim 3, wherein the directing means includes a third conduit and a valve for regulating the fluid flow therethrough from a high flow rate during reduced load requirements on the back pressure turbine to a low flow rate during high load requirements on the back pressure turbine.

5. The structure recited in claim 1, and further including:

bypass means including a third conduit for directing at least a part of the motive fluid from the vapor generator to the heating chamber in bypassing relation with all of the turbines, said bypass means further including means for desuperheating and depressurizing the motive fluid flow through said bypass means to a lower temperature and pressure and a valve for regulating the motive fluid through said third conduit.

6. The structure recited in claim 1 and further including:

a branch conduit providing a motive fluid communication between the first conduit and the back pressure turbine, and a regulating valve interposed in said branch conduit and effective to interrupt flow of motive fluid to the back pressure turbine during reduced turbine load requirements and reduced liquid heating requirements.

7. The structure recited in claim 1 and further including:

means for maintaining the pressure of the motive fluid in the heating chamber constant regardless of the load requirements on the turbines.

8. The structure recited in claim 1 and further including:

means for bleeding motive fluid exhausted from the back pressure turbine to the condenser at a controlled rate to minimize overheating of the back pressure turbine when the distillation plant is shut down.

9. The structure recited in claim 7, wherein:

the constant pressure maintaining means includes a pressure regulating valve disposed in the motive fluid inlet to the back pressure turbine.

10. The structure recited in claim 1 in which:

the means for generating the motive fluid includes a nuclear reactor, and further including a reheater interposed in the first conduit for reheating the partially expanded motive fluid from the first turbine.

11. The structure recited in claim 1 in which:

the means for generating the motive fluid includes a nuclear reactor as a heat source, a vapor generator, and a closed loop heat exchange circuit for transferring heat from said reactor to said vapor generator.

12. The structure recited in claim 10 and further including:

a moisture separator associated with the reheater for removing condensate formed by the partially expanded motive fluid before admission to the back pressure turbine.

13. The structure recited in claim 11, and further including:

a moisture separator interposed in the first conduit for removing condensate formed by the partially expanded motive fluid before admission to the back pressure turbine.

14. The structure recited in claim 13, and further including:

a reheater interposed in the first conduit downstream of the moisture separator for reheating the partially expanded motive fluid after removal of condensate by the moisture separator.

References Cited

UNITED STATES PATENTS

| | | | |
|---|---|---|---|
| 2,893,926 | 7/1959 | Worthen et al. | 202—82 |
| 3,213,001 | 10/1965 | Schmidt | 202—173 |

CARROLL B. DORITY, JR., *Primary Examiner.*

U.S. Cl. X.R.

60—67, 105; 202—173; 203—22